Feb. 3, 1925. 1,524,792
P. B. LASKEY
EXTRUDING MACHINE
Filed May 20, 1921 2 Sheets-Sheet 1

Inventor:
Philip B. Laskey
by Heard Smith & Tennant.
Attys

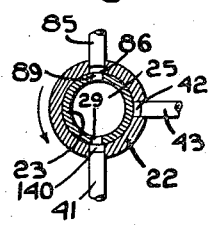
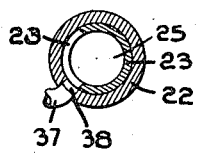
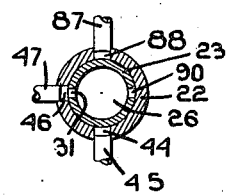
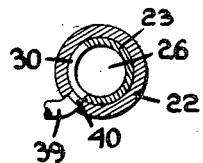
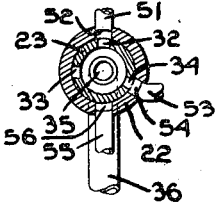
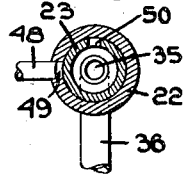
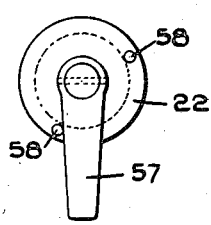
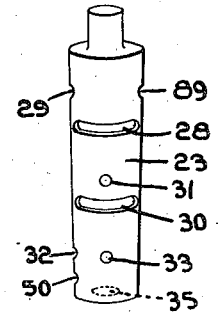
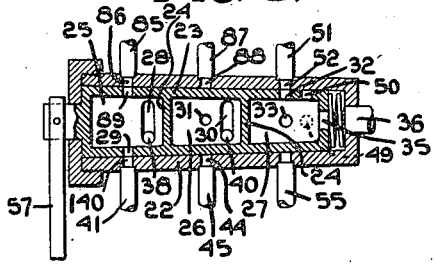
Inventor.
Philip B. Laskey
by Heard Smith & Tennant.
Attys.

Patented Feb. 3, 1925.

1,524,792

UNITED STATES PATENT OFFICE.

PHILIP B. LASKEY, OF MARBLEHEAD, MASSACHUSETTS, ASSIGNOR TO THE CHOCOLATE SPONGE CO., INC., OF BROOKLYN, NEW YORK, A CORPORATION OF NEW YORK.

EXTRUDING MACHINE.

Application filed May 20, 1921. Serial No. 471,213.

*To all whom it may concern:*

Be it known that I, PHILIP B. LASKEY, a citizen of the United States, and resident of Marblehead, county of Essex, State of Massachusetts, have invented an Improvement in Extruding Machines, of which the following description, in connection with the accompanying drawing, is a specification, like characters on the drawing representing like parts.

This invention relates to extruding machines, that is, machines which are designed to deliver plastic material, such for instance, as dough or pulled candy, etc., from a nozzle in a stream.

One feature of the present invention relates to an improved extruding machine which is constructed so that the material may be forced therefrom in a practically continuous stream. This is accomplished by providing two extruding containers each having a delivery nozzle and a plunger for forcing the material through the nozzle and by providing means for operating said plungers alternately so that while the material is being extruded from one container the other container may be filled, and when the first-named container has been emptied then the plunger for the second container is operated to force material therefrom with the result that the material will be delivered from the apparatus continuously.

The extruding plungers are actuated by hydraulic means and other feature of the invention relates to a novel form of hydraulic mechanism by which the initial forward movement of each plunger during which the material is being compressed in the container, is a more rapid movement than that of the plunger during the extruding process. The advantage of this construction is that the movement of the plunger, preliminary to the extruding process, is hastened somewhat, so that the extruding process may be carried on more expeditiously.

Other objects of the invention are to improve extruding machines in various ways all as will be more fully hereinafter set forth.

In order to give an understanding of my invention I have illustrated in the drawings a selected embodiment thereof which will now be described after which the novel features will be pointed out in the appended claims.

Fig. 1 is a sectional view showing an extruding machine embodying my invention, said view showing the machine more or less in diagram.

Figs. 2, 3, 4, 5, 6, and 7 are sectional views through the controlling valve on substantially the lines 2—2, 3—3, 4—4, 5—5, 6—6, and 7—7 respectively.

Fig. 8 is a longitudinal sectional view through the controlling valve.

Fig. 9 is a view of the valve plug.

Fig. 10 is an end view of the valve.

Figure 1:
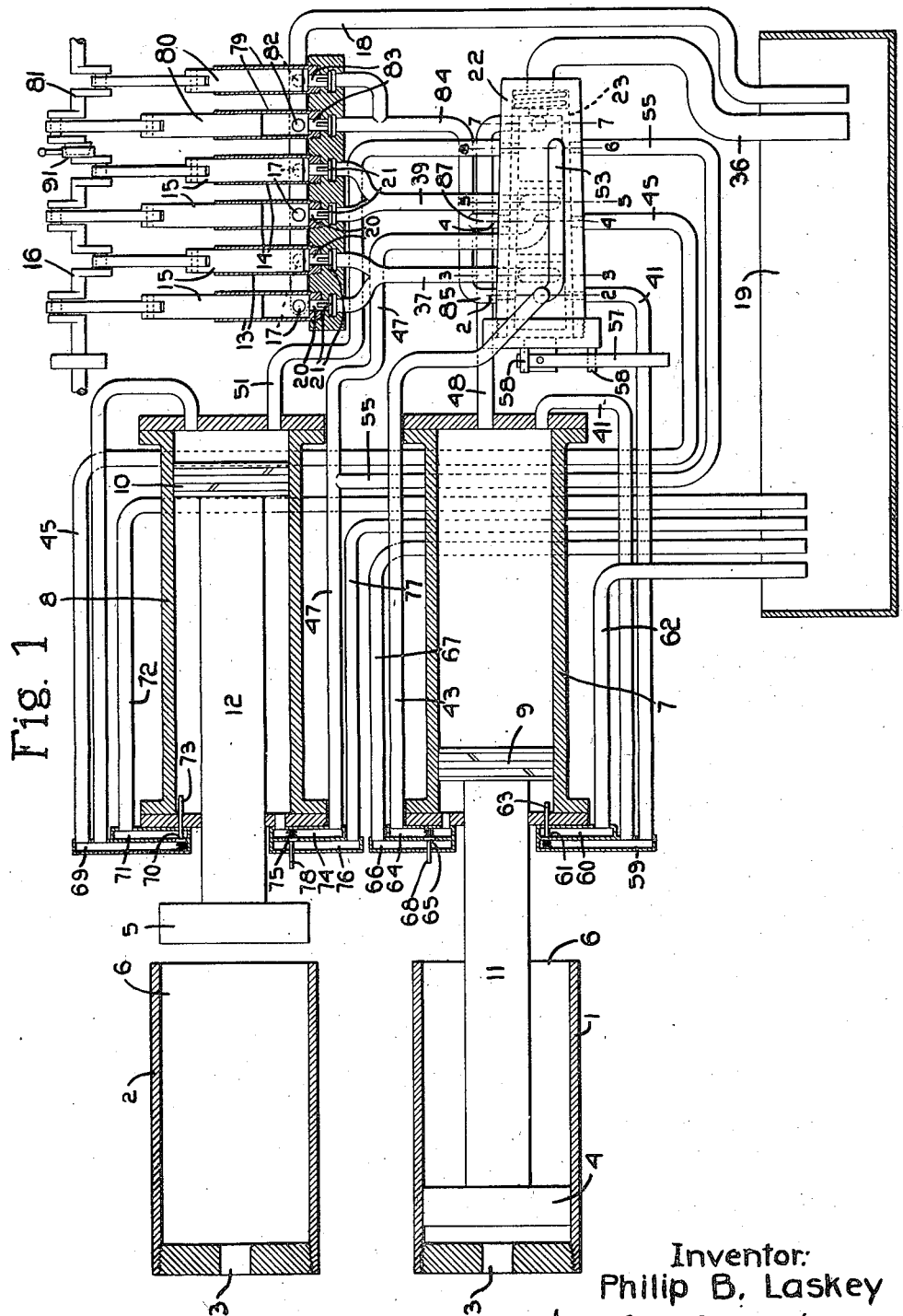

Referring to Fig. 1, 1 and 2 indicate two extruding containers, each having a discharge opening or nozzle 3 through which the material is extruded, and 4 and 5 are extruding plungers operable in the containers for forcing the material through the nozzles 3. These plungers 4 and 5 are withdrawable from the open ends 6 of the containers thereby to permit the containers to be filled with the material to be extruded, this being a construction more or less commonly employed in extruding machines.

The plungers 4 and 5 are actuated by hydraulic means and I propose to arrange such means so that the plungers will operate alternately, so that while one plunger is acting to extrude the material from its container the other plunger may be withdrawn to enable this container to be filled.

The hydraulic device for operating the plungers is herein shown as comprising two cylinders 7 and 8 in which are received pistons 9 and 10, said pistons having piston rods 11, 12 which are connected to the plungers 4 and 5 respectively. Each piston is a double acting piston and therefore operates to give each plunger both its working or extruding stroke and its return stroke.

The pistons are actuated by introducing fluid under pressure into the cylinders and I have herein shown a pump device or fluid forcing mechanism for this purpose. While any suitable pump may be employed which will operate to force the fluid under pressure into the cylinders I have herein shown a pump comprising the two pairs of cylinders 13 and 14, each cylinder having a piston or plunger 15 operating therein which is connected to and actuated by a motor driven crank shaft 16. Each cylinder is provided with an intake port 17 communicating with an intake pipe 18 which leads to a tank or receptacle 19 containing the liquid. It will be understood that each inlet port will have a suitable inwardly opening check valve associated therewith. Each cylinder is also provided with an exhaust port 20 having an outwardly opening check valve 21 associated therewith and said exhaust ports are connected by suitable piping to the cylinders. The pump pistons 15 are shown as single acting pistons and the object of having them arranged in pairs is so that a continuous pressure may be developed.

The pair of cylinders 13 are herein shown as operating to force the fluid into the cylinder 7 and the pair of pistons 14 similarly operate to deliver the fluid to the cylinder 8.

A suitable controlling valve is employed between the fluid forcing pumps and the cylinders and which controls the inlet to each cylinder and also the exhaust therefrom. This controlling valve is so arranged that when it is adjusted into one position, the fluid is forced into one cylinder thereby to give the piston therein its working stroke and at the same time it is delivered to the other cylinder to cause the piston to have its return stroke. A reversing of the position of the valve will cause the piston in the last named cylinder to have its working stroke and that in the first named cylinder to have its return stroke.

While any suitable valve may be employed I have illustrated herein a valve in the nature of a plug valve and which comprises a valve casing 22 in which operates a plug valve 23. This valve plug 23 is hollow and is divided into sections by partitions 24, said partitions forming the chambers 25, 26 27 in the valve plug. The valve plug is provided with an inlet port 28 leading to the valve chamber 25 and an outlet port 29 leading therefrom, said plug is also provided with an inlet port 30 leading to the valve chamber 26 and an outlet port 31 leading therefrom. The valve plug chamber 27 is an exhaust chamber through which the fluid is exhausted from each of the cylinders and said chamber is provided with the inlet ports 32, 33 and 34 and with the discharge port 35 in its end which leads to a discharge pipe 36 that extends back to the tank 19.

The discharge ports of the pair of cylinders 13 are connected to a pipe 37 leading to a port 38 in the casing 22, said port being situated to have communication with the inlet port 28 in all adjusted positions of the vavle, said port 28 being a long port for this purpose.

The cylinders 13, therefore, will be at all times forcing fluid into the valve chamber 25. The other pair of cylinders 14 have their discharge ports connected by a pipe 39 with a port 40 in the valve casing 22 which port is at all times in communication with the inlet port 30 which is a long port as shown in Fig. 5. The valve casing 22 is provided with a port 140 situated to communicate with the discharge port 29 and communicating with a pipe 41 which leads to the right hand end of the cylinder 7. The valve casing is provided with another port 42 adapted to register with the port 29 when the valve is properly turned and which communicates, by a pipe 43, with the left hand end of the cylinder 7.

The valve casing 22 is also provided with a port 44 situated to communicate with the valve plug port 31 when the valve is properly turned and also to communicate by a pipe 45 with the right hand end of the cylinder 8. Said valve casing has another port 46 situated to communicate with the port 31 and connected by a pipe 47 to the left hand end of the cylinder 8.

The right hand end of the cylinder 7 is connected by an exhaust pipe 48 to a port 49 in the valve casing 22, which port is adapted to communicate with a port 50 formed in the valve plug. The right hand end of the cylinder 8 is provided with an exhaust pipe 51 which leads to a port 52 in the valve casing 22, said port being adapted to communicate with the port 32 of the valve plug.

The pipe 43 leading to the left hand end of the cylinder 7 is provided with an exhaust branch 53 which communicates with a port 54 in the valve casing 22 that is adapted to register with the port 34 of the valve plug and the pipe 47 leading to the left hand end of the cylinder 8 is provided with an exhaust branch 55 leading to a port 56 in the valve casing 22 which is adapted to register with the port 33 of the valve plug.

These various ports are so arranged that when the valve is in the position shown in Fig. 1 and in the sectional views Figs. 2 to 7 the pumps 13 will deliver fluid under pressure into the valve chamber 25 and such fluid will pass into the registering ports 29, 140 and through the pipe 41 to the right hand end of the cylinder 7 thereby forcing the piston 9 to the left. At the same time the port 42 is closed but the port 54 at the end of the exhaust branch 53 is open into the exhaust chamber 27 of the valve through the port 34 and therefore the fluid is exhausted from the left hand side of the piston 9 as said piston moves forward. In the same position of the valve the port 31 of the valve plug communicates with a port 46 leading to the pipe 47 and therefore the pair of pumps 14 operate to force fluid under pressure into the valve chamber 26 and through the aligned ports 31, 46 and pipe 47 into the left hand end of the cylinder 8 thereby to move the piston 10 toward the right. In the same position of the valves the port 52 of the exhaust pipe 51 will communicate with the port 32 so that the fluid at the right of the piston 10 can be exhausted. With this position of the valve the piston 9 will be given its working stroke to the left while the piston 10 will be given its return stroke toward the right.

If the valve plug is turned through ninety degrees in the direction of the arrow, Fig. 2, then the proper ports will be connected to give the piston 10 its working stroke and to give the piston 9 its return stroke. In this latter position of the valve the port 31 of the valve chamber 26 will communicate with the port 44 of the pipe 45 so that the fluid which is forced into the chamber 26 by the pumps 14 will be delivered to the right hand end of the cylinder 8. At the same time the port 29 of the valve chamber 25 communicates with the port 42 of the pipe 43 so that the pair of cylinders 13 will be forcing the fluid into the left hand end of the cylinder 7. Furthermore in this latter adjusted position the port 49 of the exhaust pipe 48 will communicate with the valve plug port 50 and the exhaust pipe branch 55 will be in communication with the port 33 so that the right hand end of the cylinder 7 and the left hand end of cylinder 8 may exhausted.

The valve plug 23 is provided with a handle 57, by which it may be operated and the valve casing will preferably be provided with stops 58 to limit the swinging movement of the handle.

With the above arrangement the operation of bringing the handle 57 against the stop 58 will move the valve into the position shown in Figs. 2 to 7 thus opening the ports necessary to force the piston 9 to the left and the piston 10 to the right, while a movement of the valve handle against the opposite stop will reverse the valve and cause the piston 9 to move to the right and the piston 10 to move to the left.

The speed at which the pistons move depends upon the speed with which fluid is delivered by the pumps. During the working stroke when the material is being extruded from the exhaust the pistons will move relatively slowly. During the backward stroke the pistons will move more rapidly, partly because there is no resistance to the back stroke and partly because the piston rod takes up a considerable portion of the space in the cylinder at the left of the piston and therefore there is less volume in the cylinder at the left hand side of the piston.

The pumps 13 and 14 are working constantly and in order to avoid building up any undesirable pressure whenever any piston reaches the end of its stroke I have provided by-passes and means for automatically opening the by-passes when the pistons reach the end of their stroke so that the fluid which is pumped by the pumps will be by-passed to the tank 19 instead of building up a pressure in the system.

The pipe 41 through which fluid is delivered to the right hand end of the cylinder 7 leads into a chamber 59 so that the fluid in passing to the cylinder passes through this chamber 59. This chamber 59 communicates with another chamber 60 through a port controlled by a spring pressed valve 61 and the chamber 60 communicates with the by-pass pipe 62 leading back to the tank 19. The valve 60 has a stem 63 constructed to be engaged by the piston 9 when it reaches the left hand end limit of its movement, such engagement operating to open the valve 61. This valve is normally closed so that while the piston 9 is moving from the right to the left the liquid will be forced through the pipe 41 into the cylinder but when the piston reaches the left hand limit of its movement it engages the valve stem 63 and opens the valve 61. When this occurs the fluid which is pumped through the valve chamber 25 will pass through the port into the chamber 60 and will be by-passed to the tank 19. The pipe 43 through which fluid is delivered to the left hand end of the cylinder 7 communicates with a chamber 64 which in turn communicates through a port controlled by a valve 65 with a chamber 66, the latter having a by-pass pipe 67, connected thereto which leads back to the tank 19. The valve 65 is provided with a valve stem 68 adapted to be engaged by the plunger 4 when the piston reaches the right hand limit of its movement and the opening of the valve 65 allows the fluid which is pumped through the pipe 43 to be by-passed to the tank 19.

The pipe 45 leading to the right hand end of the cylinder 8 communicates with a chamber 69 which is connected through a port controlled by a spring pressed valve 70 with another chamber 71 to which is connected to a by-pass 72 leading back to the tank. The stem 73 of the valve 70 is adapted to be engaged by the piston 10 when it reaches the left hand limit of its movement thereby to open the valve 70 and thus connecting the pipe 45 with the by-pass pipe 72. The pipe 47 communicates with the left hand end of the cylinder 8 through a chamber 74 and the latter communicates through a port normally closed by a valve 75 with a chamber 76 to which is connected the by-pass pipe 77 leading back to the tank 19. The valve 75 has the valve stem 78 which is engaged by the plunger 5 when the piston 10 reaches the right hand limit of its movement whereby the pipe 47 is connected to the by-pass 77.

It will be seen that as soon as either piston reaches either limit of its movement the by-pass is opened automatically to prevent abnormal pressures from being built up.

In the operation of extruding machines of this type the operator will fill the container 2 with material when the plunger has been withdrawn and when the plunger begins its working stroke it is moved into the open mouth of the container and then acts on the material to compress the latter solidly before the extruding operation begins.

I have provided herein means for increasing the speed of movement of the piston during the first part of its working stroke and until the material has been compressed in the container sufficiently to cause the extruding process to begin. I accomplish this by providing an auxiliary pump which co-operates with the main pump during the initial forward movement of each piston thereby to increase the amount of fluid which is pumped into the cylinder. This auxiliary pump comprises the two pump cylinders 79 in which plungers 80 operate, said plungers being driven by a motor driven crank shaft 81. The auxiliary pump cylinders are provided with inlet ports 82 communicating with the intake pipe 18 and with exhaust ports 83 communicating with a pipe 84. This pipe is branched, one branch 85 leading to a port 86 in the valve casing and the other branch 87 leading to a port 88 in the valve casing. These ports 86 and 88 are adapted to register with ports 89 and 90 leading to the valve chambers 25 and 26 respectively. The ports 89, 90 are so arranged that when one is opened the other is closed, and therefore the auxiliary pump will be operative to pump into only one valve chamber at a time. When the valve is adjusted to cause the piston 9, for instance, to move to the right then the ports for the auxiliary pump will be properly positioned so that said pump will pump fluid into the valve chamber 25. When the valve is reversed so that the piston 10 is being forced to the right the auxiliary pump will be operative to pump fluid into the valve chamber 26.

The crank shaft 81 is connected to the shaft 16 by means of suitable clutch 91 and in the operation of the device the operator will clutch the shaft 81 to the shaft 16 when either piston begins its forward movement and as soon as the plunger has moved into the container and has compressed the material then the clutch may be disengaged thus rendering the auxiliary pump inoperative. The movement of the piston by which the material is extruded is accomplished by the main pump. The auxiliary pump is merely used to hasten the movement of the piston from its retracted position to a position within the container where the material is solidly compacted together.

I claim.
1. In an extruding machine, the combination with two containers each having a delivery nozzle, of a plunger operable in each container to force material through the nozzle, hydraulic means to operate the plungers alternately, and a single valve to control said means.

2. In an extruding machine, the combination with two containers each having a delivery nozzle, of a plunger operable in each container to force material through the nozzle, separate hydraulic means to operate each plunger and a controlling valve common to both means.

3. In an extruding machine, the combination with two containers each having a delivery nozzle, of a plunger operable in each container to force material through the nozzle, hydraulic means to operate the plungers alternately and a controlling means common to both plungers and controlling the hydraulic operation thereof.

4. In an extruding machine, the combination with a cylinder, of a double acting piston therein, an extruding plunger operated by the piston, a main fluid forcing mechanism continuously to deliver fluid under pressure to the cylinder thereby to operate the piston, and an auxiliary fluid forcing device operable at will to augment the operation of the main fluid forcing mechanism.

5. In an extruding machine, the combination with a cylinder, of a double acting piston therein, an extruding plunger operated by the piston, a main fluid forcing mechanism to deliver fluid under pressure to the cylinder thereby to operate the piston, and an auxiliary fluid forcing device for operation at the same time as the main mechanism to assist the operation of the main fluid forcing mechanism during the first part of the working stroke of the piston.

6. In an extruding machine, the combination with two cylinders, each having a piston therein, of an extruding plunger operated by each piston, a main plunger forcing mechanism consisting of two pumps, one for forcing fluid into one cylinder and the other for forcing fluid into the other cylinder, and a valve device connecting both pumps for controlling the delivery of fluid to the cylinders.

7. In an extruding machine, the combination with two cylinders, of a double acting piston in each cylinder, an extruding plunger connected to each piston, two pump devices, one for forcing fluid under pressure into each cylinder, and a valve connecting both pump devices and both cylinders and operating to determine which end of either cylinder will be connected to the pump device.

8. In an extruding machine, the combination with two cylinders, of a double acting piston in each cylinder, an extruding plunger connected to each piston, two pump devices, one for each cylinder, each pump device operating to force fluid under pressure into the cylinder and a valve device constructed to admit the fluid under pressure simultaneously to one end of one cylinder and the opposite end of the other cylinder.

9. In an extruding machine, the combination with a cylinder, of a double acting piston therein, an extruding plunger carried by the piston, a continuously acting pump device to force fluid under pressure into the cylinder, and means operated by the piston when it reaches either end of its stroke to by-pass the fluid delivered from the pump.

10. In an extruding machine, the combination with a cylinder, of a double acting piston therein, a tank containing fluid, a pump device to take fluid from the tank and forcing it into either end of the cylinder, and means operated by the piston when it reaches either end of its stroke to by-pass the fluid from the pump back to the tank.

In testimony whereof, I have signed by name to this specification.

PHILIP B. LASKEY.